United States Patent
Martin et al.

(10) Patent No.: US 10,672,521 B2
(45) Date of Patent: Jun. 2, 2020

(54) SPACERS WITH DEFLECTION-LIMITED PERIPHERAL SPRINGS FOR NUCLEAR FUEL ASSEMBLIES AND METHODS OF MAKING THE SAME

(75) Inventors: Kathryn M. Martin, Wilmington, NC (US); David Grey Smith, Leland, NC (US); Thomas J. Rambach, Wilmington, NC (US)

(73) Assignee: GLOBAL NUCLEAR FUEL—AMERICAS, LLC, Wilmington, NC (US)

( * ) Notice: Subject to any disclaimer, the term of this patent is extended or adjusted under 35 U.S.C. 154(b) by 2225 days.

(21) Appl. No.: 13/429,217

(22) Filed: Mar. 23, 2012

(65) Prior Publication Data
US 2013/0251088 A1   Sep. 26, 2013

(51) Int. Cl.
*G21C 3/352* (2006.01)
*G21C 3/322* (2006.01)
*G21C 3/356* (2006.01)

(52) U.S. Cl.
CPC ............. *G21C 3/322* (2013.01); *G21C 3/352* (2013.01); *G21C 3/356* (2013.01); *Y02E 30/38* (2013.01); *Y10T 29/49826* (2015.01)

(58) Field of Classification Search
CPC .................................. G21C 3/356; G21C 3/34
USPC ......................................... 376/438–444, 462
See application file for complete search history.

(56) References Cited

U.S. PATENT DOCUMENTS

| | | | |
|---|---|---|---|
| 4,740,350 A | 4/1988 | Taleyarkhan |
| 4,879,090 A | 11/1989 | Perrotti et al. |
| 5,267,291 A | 11/1993 | Matzner |
| 5,278,883 A | 1/1994 | Patterson |

(Continued)

FOREIGN PATENT DOCUMENTS

| | | | |
|---|---|---|---|
| JP | 56116698 U | 9/1981 |
| JP | 6472095 A | 3/1989 |

(Continued)

OTHER PUBLICATIONS

Elastic/Plastic Deformation. NDE/NDT Resource Center. accessed Jul. 2015. <https://www.nde-ed.org/EducationResources/CommunityCollege/Materials/Structure/deformation.htm>.*

(Continued)

*Primary Examiner* — Lily C Garner
(74) *Attorney, Agent, or Firm* — Ryan Alley IP

(57) ABSTRACT

Fuel spacers include at least one specialized bathtub on an outer perimeter band. Specialized bathtubs include an elastic resistive extension and a corresponding deflection limiter on a same outer face of the perimeter band. The elastic resistive extension provides flexible resistance to the channel, and the deflection limiter provides rigid movement limitation beyond a particular threshold between channel and spacer. The positioning, spring constant, length, number, and other properties of the specialized bathtub can be chosen based on the desired fuel assembly properties and expected transverse loads in fuel shipping and operation against which specialized bathtubs resiliently protect. The specialized bathtubs can be formed from a simplified stamp operation out of the (Continued)

perimeter band. Bathtubs can be placed on any position(s) on the perimeter band of example embodiment spacers used in nuclear fuel assemblies.

17 Claims, 4 Drawing Sheets

(56) References Cited

U.S. PATENT DOCUMENTS

| | | | |
|---|---|---|---|
| 6,542,567 B1 | 4/2003 | Mayet et al. | |
| 7,835,484 B2 * | 11/2010 | Eom | G21C 3/352 376/438 |
| 2006/0045232 A1 * | 3/2006 | Edsinger | 376/442 |
| 2007/0030943 A1 | 2/2007 | Makovicka | |
| 2008/0267340 A1 | 10/2008 | Higgins | |
| 2013/0251089 A1 | 9/2013 | Liebler et al. | |

FOREIGN PATENT DOCUMENTS

| | | | |
|---|---|---|---|
| JP | 02257092 A | | 10/1990 |
| JP | 09257976 A | | 10/1997 |
| JP | 2009133736 A | * | 6/2009 |
| JP | 2014515474 A | | 6/2014 |

OTHER PUBLICATIONS

Ressa, Aaron. Plastic Deformation and Ductile Fracture Behavior of Inconel 718. Diss. The Ohio State University, 2015. pp. 54-63. Available online: <https://etd.ohiolink.edu/letd.send_file?accession=osu1449001835&disposition=inline>.*

Unofficial English translation of an SE Office Action dated Feb. 14, 2014, issued in connection with corresponding SE Patent Application No. 1350338-8.

Unofficial English Translation of Japanese Office Action issued in connection with corresponding JP Application No. 2013057466 dated Feb. 3, 2015.

* cited by examiner

SPACERS WITH DEFLECTION-LIMITED PERIPHERAL SPRINGS FOR NUCLEAR FUEL ASSEMBLIES AND METHODS OF MAKING THE SAME

BACKGROUND

FIG. 1 is a sectional illustration of a conventional nuclear reactor fuel assembly 10 typically used in commercial light water nuclear reactors for electricity generation throughout the world. Several fuel assemblies 10 are shipped to and placed in a reactor in close proximity to sustain a nuclear chain reaction. A fluid moderator and/or coolant conventionally passes through fuel assembly 10 in an axial direction, enhancing the chain reaction and/or transporting heat away from the assembly 10.

As shown in FIG. 1, fuel assembly 10 includes multiple fuel rods 14 containing fissile material and extending in the axial direction within the assembly 10. Fuel rods 14 are bounded by a channel 12 that forms an exterior of the assembly 10, maintaining fluid flow within assembly 10 throughout the axial length of assembly 10. Conventional fuel assembly 10 also includes one or more conventional fuel spacers 18 at various axial positions. Fuel spacer 18 permits fuel rods 14 to pass through grid-like openings in spacer 18, thereby aligning and spacing fuel rods 14. One or more water rods 16 or other assembly features may also pass through spacer 18, and grid size and shape, and the overall shape of spacer 18 may vary across different designs of assembly 10.

As shown in FIG. 1, fuel spacer 18 may include one or more bathtubs 44 that extend from spacer 18 and contact internal surfaces of channel 12. For example, as shown in FIG. 1, multiple bathtubs 44 may be on each face of fuel spacer 18 extending out toward channel 12. In this way, bathtub 44 may keep fuel spacer 18 rigidly aligned within and spaced from an internal surface of channel 12. Bathtubs 44 may be welded to, fastened to, clamped on, or deposited on fuel spacer 18 at desired points in any number necessary to secure spacer 18 within channel 12. Similarly, bathtubs 44 extend a length required to entirely close any gap between spacer 18 and channel 12, such that the two are always in rigid contact.

SUMMARY

Example embodiments include fuel spacers with specialized bathtubs, fuel assemblies containing the same, and methods of fabricating and using such structures. Example embodiment fuel spacers are useable with several types of conventional nuclear fuel and include grid openings to receive and align fuel rods in the assembly. The fuel spacers include an outer perimeter band extending around the spacer with a specialized bathtub on one or more faces of the perimeter band. Specialized bathtubs can include elastic resistive members, like springs or flexible extensions, and a corresponding deflection limiter on a same outer face of the perimeter band in any number and relationship, in close proximity or not. The elastic resistive member provides relatively flexible movement between a spacer and an internal surface of a channel, whereas the deflection limiter is rigid and prevents movement beyond a particular point between channel and spacer. The spring constant, length and other elastic properties of the elastic resistive member can be chosen based on number of specialized bathtubs per side and desired positioning; similarly, length and positioning of deflection limiters can be chosen based on the same criteria and the properties of the elastic resistive members.

Specialized bathtubs can be formed from a simplified stamping operation of the perimeter band, potentially reducing complexity and axial profile of example embodiment spacers. Bathtubs can be placed on any position(s) on the perimeter band of example embodiment spacers used in nuclear fuel assemblies. By providing a desired mixture of rigid and flexible movement between a fuel spacer, fuel rods therein, and channel, example embodiments and methods may resiliently guard against a variety of transverse loads encountered by fuel in its lifetime. By maintaining a relatively slim axial profile, example embodiment spacers may further enhance axial fluid flow and thermodynamic transfer between fuel assemblies including example embodiment spacers and coolant flowing therethrough.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the terms which they depict.

DETAILED DESCRIPTION

Figure 1:
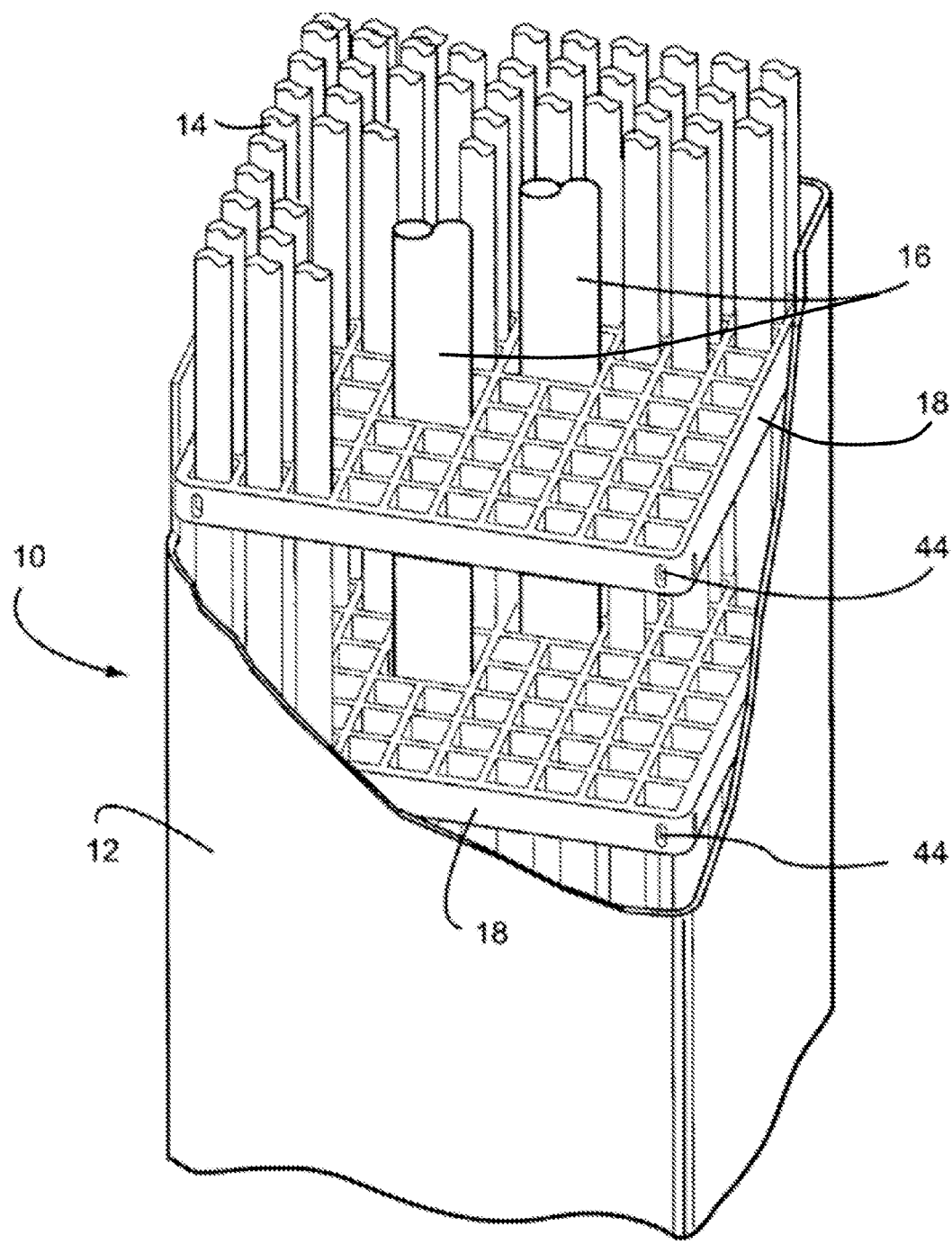
FIG. 1 is an illustration of a section of a conventional nuclear fuel assembly.

This is a patent document, and general broad rules of construction should be applied when reading and understanding it. Everything described and shown in this document is an example of subject matter falling within the scope of the appended claims. Any specific structural and functional details disclosed herein are merely for purposes of describing how to make and use example embodiments. Several different embodiments not specifically disclosed herein fall within the claim scope; as such, the claims may be embodied in many alternate forms and should not be construed as limited to only example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected," "coupled," "mated," "attached," or "fixed" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.). Similarly, a term such as "communicatively connected" includes all variations of information exchange routes between two devices, including intermediary devices, networks, etc., connected wirelessly or not.

As used herein, the singular forms "a", "an" and "the" are intended to include both the singular and plural forms, unless the language explicitly indicates otherwise with words like "only," "single," and/or "one." It will be further understood that the terms "comprises", "comprising,", "includes" and/or "including", when used herein, specify the presence of stated features, steps, operations, elements, ideas, and/or components, but do not themselves preclude the presence or addition of one or more other features, steps, operations, elements, components, ideas, and/or groups thereof.

It should also be noted that the structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, so as to provide looping or other series of operations aside from the single operations described below. It should be presumed that any embodiment having features and functionality described below, in any workable combination, falls within the scope of example embodiments.

Applicants have recognized that fuel assemblies are subjected to a variety of shocks and strains over their lifetime, including shipping, installation, handling, seismic events, and power generation, that cover a wide array of transverse force profiles on the assembly. As such, although it is desirable to maintain fuel spacers in a central position inside of a fuel channel for even fluid flow and fuel spacing, rigid and direct contact between the spacer and channel about an entire perimeter of the two may increase the risk of damage to the spacer, channel, or fuel rods when the assembly is subjected to certain transverse loads, such as sudden impact events or intense vibration, for example. Similarly, Applicants have recognized that a rigid connection between spacer and channel, may not adequately center the spacer and channel, may not optimally distribute coolant flow, and/or may result in plastic deformation of internal spacer features during certain transverse load events, potentially damaging the assembly. Example embodiments described below address these and other problems recognized by Applicants with unique solutions enabled by example embodiments.

Figure 2:
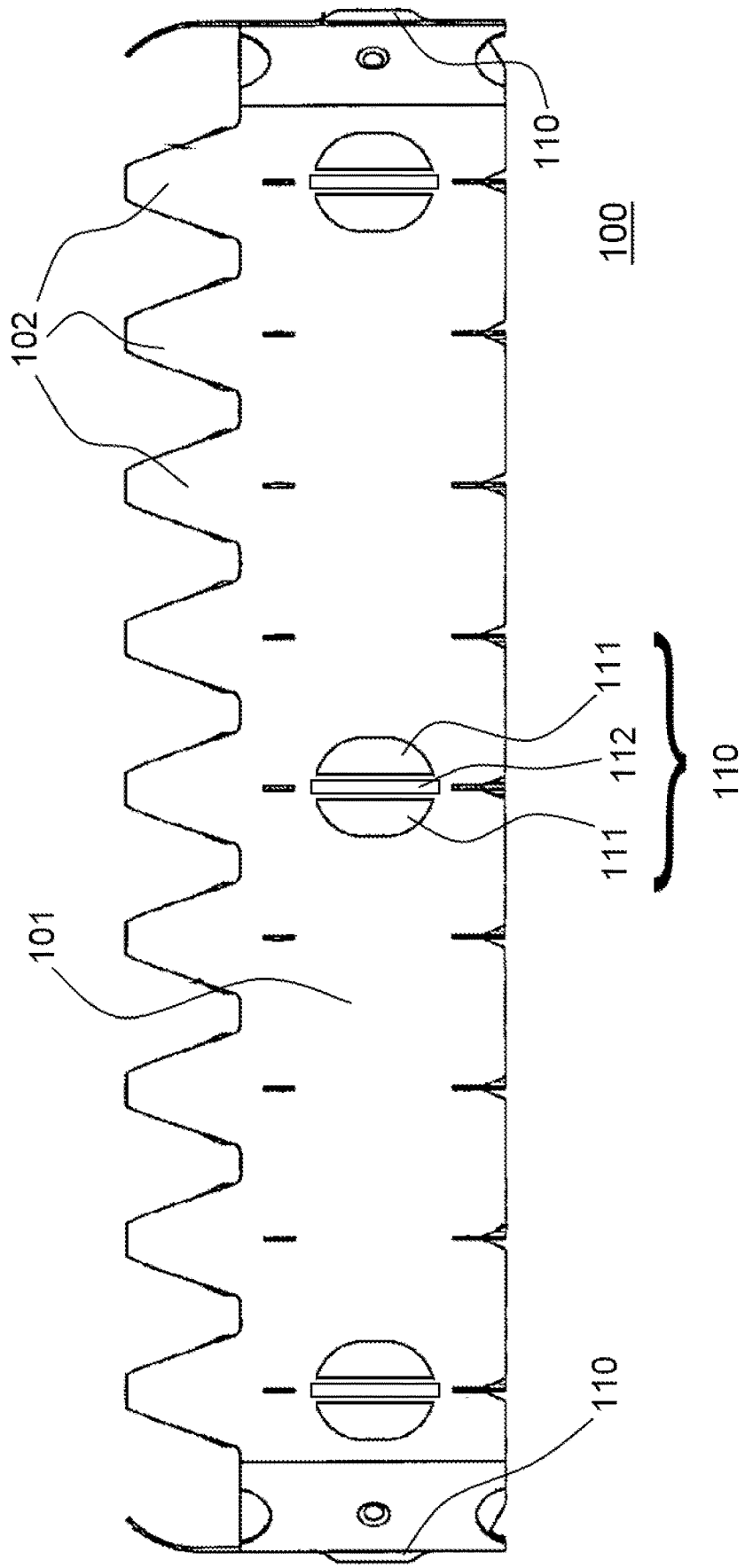
FIG. 2 is an illustration of profile view of an example embodiment spacer.

FIG. 2 is an illustration of a profile of an example embodiment fuel spacer 100. As shown in FIG. 2, example embodiment fuel spacer 100 may include several features of, and be useable with or in place of, conventional fuel spacers. For example, fuel spacer 100 includes an outer perimeter band 101 that extends around fuel rods 14 and forms a boundary within any channel 12 of an assembly. Example embodiment fuel spacer 100 may include other features, such as flow tabs 102, internal fuel rod grids 103 (FIG. 3), etc. that permit the spacer to be useable with several types of fuel assemblies through appropriate variation.

Figure 3:
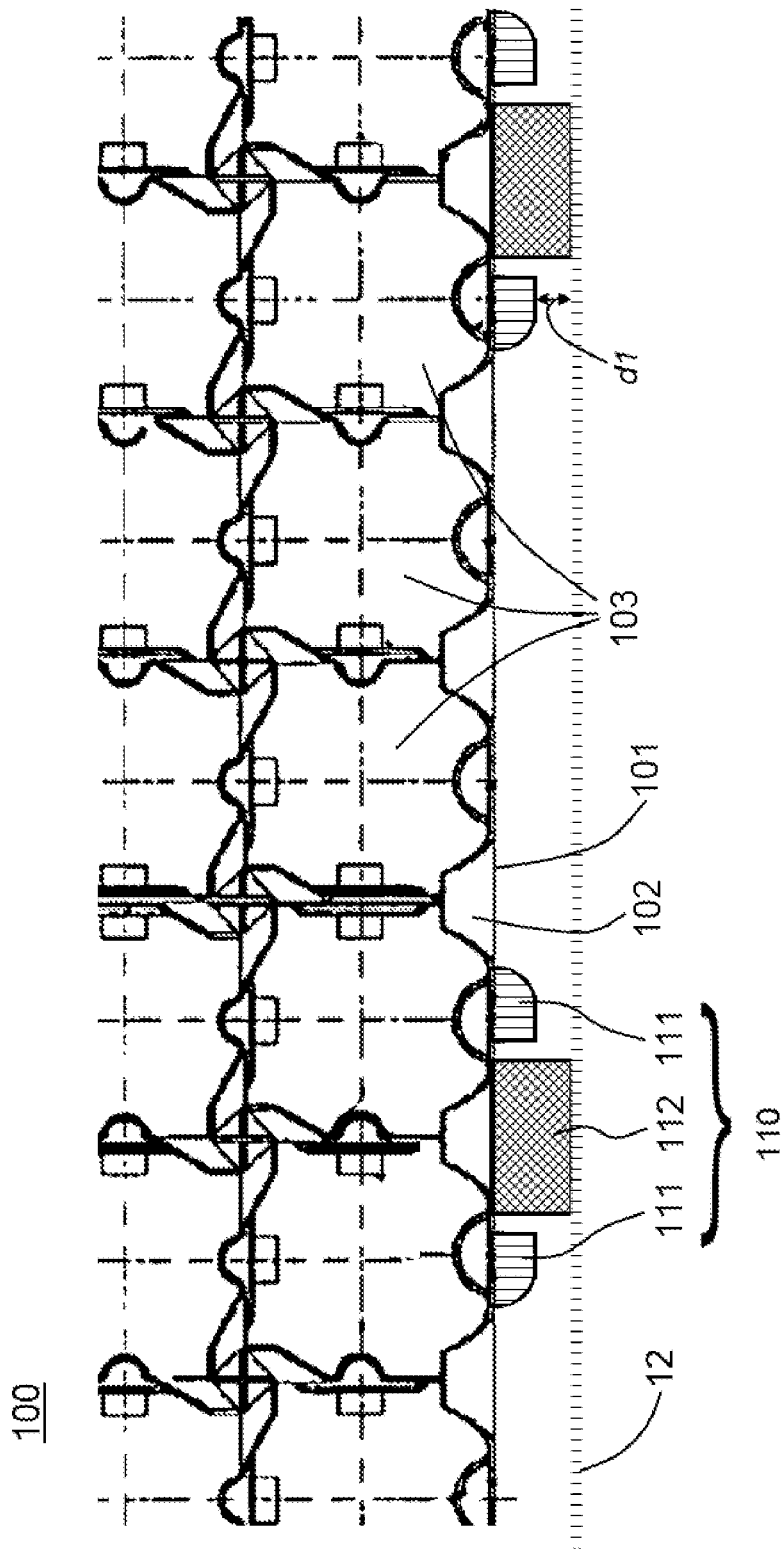
FIG. 3 is an illustration of a top-down view of an example embodiment spacer.

As shown in FIG. 2, example embodiment fuel spacer 100 includes a specialized bathtub 110 on an outer surface of perimeter band 101. Specialized bathtub 110 includes both an elastic resistive element 112 and inelastic bathtub extension 111 positioned about on perimeter band 101. FIG. 3 is a vertical perspective of an example embodiment fuel spacer 100, showing a section of spacer 100 about specialized bathtub 110 at perimeter band 101. Elastic resistive element 112 can be a spring or a resistive extension of perimeter band 101 that extends a distance from band 101 to touch an inner surface of channel 12 (FIG. 3 in dashed lines) when installed in a fuel assembly, such as in assembly 10 (FIG. 1). Elastic resistive element 112 can be configured in several ways to provide an elastic, resistive force pushing example embodiment spacer 100 away from a nearest inner surface of channel 12 and thus centering example embodiment spacer 100 within channel 12 in all transverse directions.

Elastic resistive element 112 can be chosen of a size and material that provides a strong spring constant and thus requires fewer resistive elements 112 to elastically push band 101 to a center position within channel 12. For example, elastic resistive element 112 may be formed from metal alloys, such as nickel alloys, including X718 and/or X750. Similarly, perimeter band 101 and any other element of example embodiment fuel spacer 100 may be formed of the same or compatible materials.

Elastic resistive element 112 may be formed from perimeter band 101 through a stamping or molding fabrication process that requires no additional parts or connections to perimeter band 101 and thus creates a simplified, lighter-weight example embodiment spacer 100. For example, perimeter band 101 may be fabricated through a stamping process that provides an amount of material and sets a thickness of perimeter band 101, at, for example, approximately 0.015 inch thickness or greater. Elastic resistive element 112 may be formed thereafter by expanding, stamping, and/or thinning desired portions of perimeter band 101. The material of perimeter band 101 may permit such expansion and thinning to create an elastic portion without fracture; for example nickel alloys may provide such material properties. Or, for example, resistive element 112 may be formed by welding a leaf spring to perimeter band 101 or otherwise attached to perimeter band 101. Specialized bathtubs 110 and other elements of example embodiment fuel spacers 100 may be heat treated or age-hardened following fabrication.

Elastic resistive element 112 may further be shaped to minimize a hydraulic profile of example embodiment spacer 100. For example, elastic resistive element 112 may be thin and elongated in the axial direction (defined as the vertical direction in FIG. 2) while extending minimally in the transverse direction (defined as the vertical direction in FIG. 3) so as to minimally block fluid flow while still providing the desired resistive force.

Specialized bathtub 110 also includes a deflection limiter 111 extending from perimeter band 101. Deflection limiter 111 is comparatively rigid, and, if pushed into contact with channel 12, will largely prevent any further movement of example embodiment spacer 100 toward a facing inner surface of channel 12. Deflection limiter 111 also extends toward channel 12 a shorter distance than a nearby elastic resistive element 112. In this way, deflection limiter 111 provides a clearance d1 that example embodiment spacer 100 may move toward an internal surface of channel 12 while being subject to only the restorative force of elastic resistive element 112. Clearance d1 may be selected based on a spring constant of elastic resistive element 112, a desired minimum distance between example embodiment spacer 100 and channel 12, shocking forces expected to be encountered by a fuel assembly including the same in transport, use, or accident, and/or the plastic threshold of elastic resistive member 112.

For example, d1 may be a distance less than a plastic deformation threshold of elastic resistive member 112, such that elastic resistive member 112 will maintain a same spring constant and length, and thus functionality, even following a severe transverse force that causes deflection limiter 111 to come into direct contact with an internal surface of channel 12. In the alternative or additive, for example, d1 may be a maximum distance that example embodiment spacer 100 may move toward an internal surface of channel 12 in order to preserve desired levels of flow or other thermo-hydraulic properties of a fuel assembly containing the same. In all these and other ways, deflection limiter 111 may rigidly prevent relative movement between channel 12 and example embodiment spacer 100 in desired combinations with permitted relative movement between the same that is resisted and reversed by elastic resistive member 112.

Deflection limiter 111, like elastic resistive member 112, may be formed by stamping or molding perimeter band 101 during manufacturing of example embodiment spacer 100. In this way, the manufacturing process for spacer 100 may be simplified, requiring no additional parts or connectors and minimizing weight of spacer 100 in creating deflection limiter 111. Deflection limiters 111 may be stamped with formation of perimeter band 101 so as to retain an original thickness, with little or no thinning of the material. Alternatively, deflection limiter 111 may be a separate rigid piece welded or otherwise attached to perimeter band 101.

Figure 4:
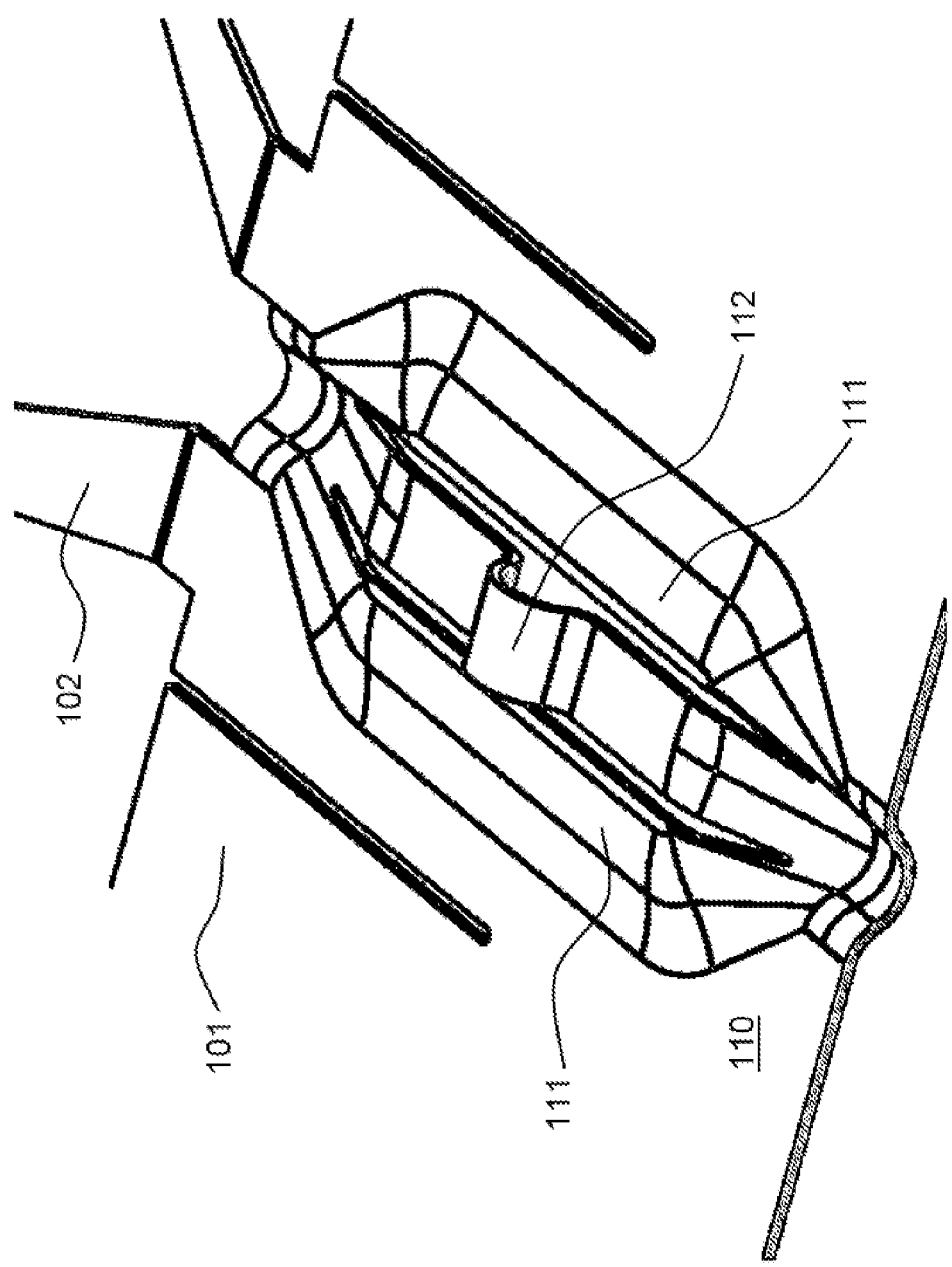
FIG. 4 is a perspective view of a detail of an example embodiment spacer and specialized bathtub.

Elastic resistive member 112 and deflection limiter 111 may be arranged in several different configurations in specialized bathtub 110. For example, as shown in FIGS. 2-4, two deflection limiters 111 may flank both sides of elastic resistive member 112 in order to prevent uneven transverse compression of elastic resistive member 112. FIG. 4 is a detail view of an example specialized bathtub 110 in such a configuration, showing deflection limiters 111 and elastic resistive member 112 formed of a single-piece from perimeter band 101. Of course, other configurations are equally possible, including a ring-type deflection limiter 111 encircling an elastic resistive member 112, deflection limiters 111 spaced at regular intervals on perimeter band 101, a single elastic resistive member 112 and deflection limiter 111 positioned on opposite ends of a face of perimeter band 101, etc. Thus, as long as a perimeter band includes an elastic resistive member 112 and deflection limiter 111 operable together to prevent plastic deformation of elastic resistive member 112, the perimeter band includes a specialized bathtub 110.

Elastic resistive member 112 and deflection limiter 111 may be relatively thin in a direction about a perimeter (defined as the horizontal direction in FIGS. 2 & 3) of example embodiment spacer 100 to minimize protrusion into open fluid flow space, minimize pressure drop, and maximize fluid flow properties past example embodiment spacer 100. Similarly, as shown in FIG. 2, elastic resistive member 112 and deflection limiters 111 may extend with greater length in an axial direction to provide desired resiliency and contact area to channel 12, without greatly interfering with fluid flow in the axial direction.

As shown in FIGS. 2 and 3, two deflection limiters 111 and elastic resistive member 112 may form a specialized bathtub 110. Of course, other numbers and arrangements of deflection limiters 111 and elastic resistive member 112 are equally useable in example embodiments. Specialized bathtubs 110 may be placed in any number and position to achieve desired stability to example embodiment spacer 100 based on properties, such as spring constant, transverse length, maximum impact force, etc. of bathtubs 110 and components thereof. For example, three specialized bathtubs 110 may be placed on each transverse face of example embodiment spacer 100 on perimeter band 101 to provide desired positioning and shock absorption to spacer 100, fuel rods aligned thereby, and fuel assemblies containing the same. Such positioning may aid in distributing transverse forces throughout example embodiment spacer 100 in any shipping orientation while also permitting example embodiment fuel spacer 100 to provide flexible centering of spacer 100 and fuel rods therein within channel 12 during operation with minimized increase to axial profile.

Example embodiment fuel spacer 100 and fuel assemblies containing the same may be manufactured and used in a simplified and reliable manner. For example, specialized bathtubs 110 may be formed in their entirety through a stamping operation that forms relatively rigid, shorter deflection limiter 111 and relatively elastic, longer resistive member 112 from perimeter band 101 through progressive thinning. These features may be stamped at any desired position to achieve desired kinetic effects and thermo-hydraulic properties of an assembly using example embodiment spacers 100. Once fabricated, example embodiment fuel spacers 100 may be assembled with fuel rods 14 (FIG. 1) at desired axial levels. Example embodiment fuel spacers 100 may permit channel 12 to be easily installed over and around fuel rods 14 without excessive frictional contact between spacers 100 and channel 12 when contacting elastic resistive members 112. The fuel assembly may then be shipped in any desired configuration and installed in a nuclear reactor while being subjected to various transverse loading and impact with minimized damage to fuel assemblies.

Example embodiments and methods thus being described, it will be appreciated by one skilled in the art that example embodiments may be varied and substituted through routine experimentation while still falling within the scope of the following claims. For example, although some example embodiments are described with specialized bathtubs in certain positions and with certain features, it is understood that bathtubs may include any combination and positioning of an elastic member and deflection limiter. Further, it is understood that example embodiments and methods can be used in connection with any type of fuel and reactor where axial spacers are used to align fuel rods. Such variations are not to be regarded as departure from the scope of the following claims.

What is claimed is:

1. A fuel spacer for use in a nuclear fuel assembly, the spacer comprising:
    a plurality of grid openings configured to receive a fuel rod through the spacer; and
    a perimeter band surrounding the grid openings and forming an outer boundary of the fuel spacer, wherein the perimeter band includes at least one specialized bathtub on an outer face of the perimeter band, and wherein the specialized bathtub includes an elastic resistive member and a corresponding rigid deflection limiter, wherein the rigid deflection limiter is stamped from the perimeter band such that the perimeter band does not overlap with the rigid deflection limiter in a transverse direction.

2. The fuel spacer of claim 1, wherein the elastic resistive member has a transverse length to contact a channel surrounding the nuclear fuel assembly, and wherein the corresponding rigid deflection limiter has a transverse length shorter than the transverse length of the elastic resistive member.

3. The fuel spacer of claim 2, wherein a difference between the transverse length of the elastic resistive member and the transverse length of the corresponding rigid deflection limiter is a length of a plastic deformation threshold of the elastic resistive member in the transverse direction so that the elastic resistive member cannot undergo plastic deformation due to a mutual planar contact to the deflection limiter.

4. The fuel spacer of claim 3, wherein the perimeter band includes a plurality of the specialized bathtubs on each outer face of the perimeter band.

5. The fuel spacer of claim 4, wherein each specialized bathtub includes the elastic resistive member with one of the corresponding rigid deflection limiters on both sides of the elastic resistive member.

6. The fuel spacer of claim 5, wherein the specialized bathtubs are formed from the perimeter band and have no internal material interruption between the perimeter band and the specialized bathtubs.

7. A nuclear fuel assembly comprising:
a plurality of nuclear fuel rods;
an outer channel surrounding the plurality of nuclear fuel rods; and
a plurality of fuel spacers through which the nuclear fuel rods extend at various axial levels within the channel, wherein,
the fuel spacers include an outer perimeter band, wherein
the outer perimeter band includes at least one specialized bathtub on an outer face of the perimeter band, wherein the specialized bathtub includes,
an elastic resistive member extending to the outer channel, and
a corresponding deflection limiter not extending to the outer channel, wherein the elastic resistive member moves elastically in a transverse direction, and wherein the corresponding deflection limiter is rigid in the transverse direction, wherein a difference between a transverse length of the elastic resistive member and a transverse length of the corresponding deflection limiter is a length of a plastic deformation threshold of the elastic resistive member so that the elastic resistive member cannot undergo plastic deformation due to contact between the outer channel and the deflection limiter.

8. The nuclear fuel assembly of claim 7, wherein the specialized bathtub is formed from the perimeter band and has no internal material interruption between the perimeter band and the specialized bathtub.

9. A fuel spacer for use in a nuclear fuel assembly, the spacer comprising:
a plurality of grid openings configured to receive a fuel rod through the spacer; and
a perimeter band surrounding the grid openings and forming an outer boundary of the fuel spacer, wherein the perimeter band includes at least one specialized bathtub on an outer face of the perimeter band, and wherein the specialized bathtub includes an elastic resistive member and a corresponding rigid deflection limiter, wherein the elastic resistive member is stamped from the perimeter band such that the perimeter band does not overlap with the elastic resistive member in a transverse direction.

10. The fuel spacer of claim 1, wherein the band does not extend between the elastic resistive member and the corresponding rigid deflection limiter.

11. The fuel spacer of claim 1, wherein the perimeter band is polygonal and includes three of the specialized bathtubs on each face, wherein each of the three specialized bathtubs includes a single elastic resistive member and only two of the corresponding rigid deflection limiters, and wherein the single elastic resistive member is between the only two corresponding rigid deflection limiters.

12. The fuel spacer of claim 1, further comprising:
a plurality of flow tabs extending axially from the band, wherein the specialized bathtub is positioned entirely between two directly adjacent flow tabs of the plurality of flow tabs.

13. The fuel spacer of claim 1, further comprising:
a plurality of flow tabs extending axially from the band, wherein the specialized bathtub is positioned directly below only a single flow tab of the plurality of flow tabs.

14. The fuel spacer of claim 1, wherein the elastic resistive member is stamped from the perimeter band such that the perimeter band does not overlap with the elastic resistive member in a transverse direction, wherein the rigid deflection limiter has a same thickness as the band, and wherein the elastic resistive member is thinner than the band.

15. The fuel spacer of claim 1, wherein the band is formed exclusively of a nickel alloy, and wherein the specialized bathtub is stamped from the band.

16. The fuel spacer of claim 1, wherein the perimeter band includes a plurality of the specialized bathtubs, wherein each of the plurality of specialized bathtubs includes a single elastic resistive member and only two of the corresponding rigid deflection limiters, wherein the elastic resistive member is between the two corresponding rigid deflection limiters, and wherein the band does not completely extend directly between the elastic resistive member and the two corresponding rigid deflection limiters.

17. The fuel spacer of claim 16, wherein each of the plurality of specialized bathtubs is stamped as a single-piece from the band.

* * * * *